United States Patent Office 2,969,347
Patented Jan. 24, 1961

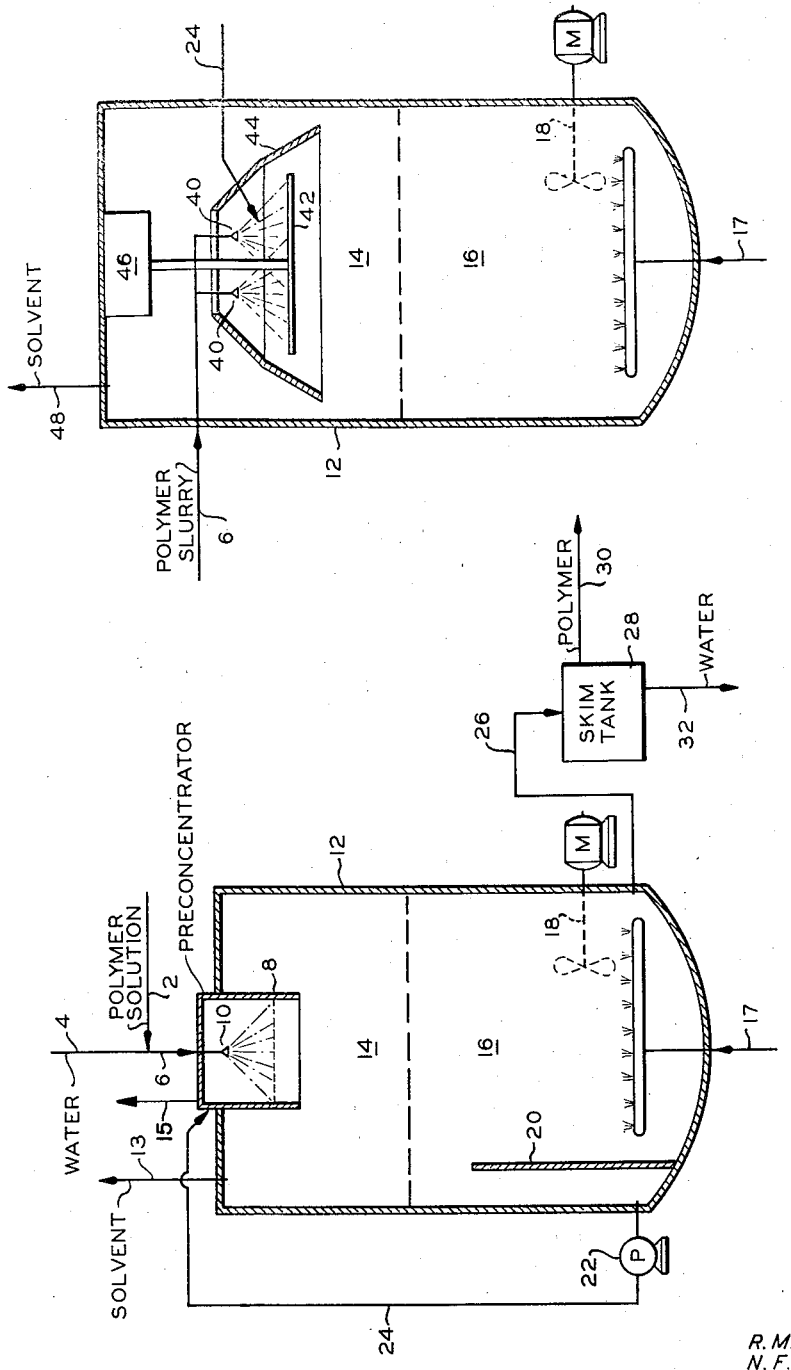

2,969,347

RECOVERY OF OLEFIN POLYMERS FROM SOLUTION

Robert M. Bellinger and Norman F. McLeod, Bartlesville, Okla., assignors to Phillips Petroleum Company, a corporation of Delaware Filed July 2, 1956, Ser. No. 595,456

12 Claims. (Cl. 260—94.9)

This invention relates to the separation of solid polymers from a mixture of polymer and liquid. In one aspect it relates to a process and apparatus for separating solid olefin polymers precipitated from solution from a solvent material. In another aspect it relates to method and apparatus for preconcentrating solid olefin polymer precipitated from a solution to remove solvent therefrom by contacting the mixture with a surface wetted with heated water in a steam atmosphere.

In certain methods of preparing solid polymers, the product is obtained as a solution of polymer in a solvent or diluent material. Inasmuch as the major uses of the polymers require a solid product, it is desirable that the polymer be separated from the solvent material such as by precipitation methods. Several methods have been proposed for treating the polymer solution to accomplish this purpose. In each of these methods, the initial step comprises treating the product effluent from the polymerization reaction zone so as to precipitate the polymer from solution. In one method, which is described in detail in a copending application of R. A. Findlay, Serial No. 591,864 filed June 18, 1956 precipitation of the polymer is effected by controlled cooling of the polymer solution. The process is carried out in a batch cyclic operation in which the first step consists of filling a cooling zone with the polymer solution. The cooling zone is then blocked off and the pressure therein is slowly reduced, at a sufficient rate to provide a relatively constant temperature drop in the solution. More usually the temperature is decreased at a rate of between about 1° F. and about 20° F. per minute. After the desired proportion of polymer has precipitated, which may be as high as 90 to 98 percent of the total polymer, the cooling vessel is opened and a slurry of polymer and solvent is discharged therefrom. Following this operation, a reheating step is provided whereby the cooling vessel is heated to an appropriate temperature level and polymer solution is again admitted thereto for cooling and precipitation. It is preferable in carrying out the aforedescribed cyclic operation to provide a number of cooling zones in parallel so that a continuous flow of effluent from the polymerization reaction zone can be treated. It is also possible to employ a number of coolers in series, with precipitation of a portion of the polymer in each cooler to provide products of varying molecular weight.

In another precipitation method, a solution of polymer under high pressure is introduced to a zone of low pressure wherein a portion of the solvent vaporizes. The cooling effect thus provided results in precipitation of the polymer, which material is withdrawn from the low pressure zone as a slurry of polymer in the solvent material. This operation is carried out more usually at a temperature of between about 70° F. and about 180° F., or higher, depending on the solvent employed. The pressure in the low pressure zone is usually subatmospheric, namely between about 0.1 and about 10 p.s.i.a. The amount of solvent vaporized during flash vaporization and precipitation of the polymer varies over a wide range, more usually between about 25 percent and about 75 percent of the amount initially present. This process for effecting precipitation of the polymer is described in detail in a copending application of R. M. Bellinger, Serial No. 506,864, filed April 18, 1955.

In still another method, a slurry of precipitated polymer in solvent is provided by spraying a solution of polymer into liquid water whereby the polymer is dispersed in the water and removed from solution. This operation is carried out by combining water at a temperature between about 60° F. and about 110° F. with a polymer solution having a temperature of between about 350° F. and about 200° F. to provide a mixture of polymer, water and solvent having a temperature between about 110° F. and about 150° F. More usually the amount of water required is between about 1 and about 5 pounds per pound of polymer solution. Sufficient pressure is required during the process to maintain the solvent and water in a liquid state. This process is described in detail in a copending application of R. G. Wallace, Serial No. 584,812 filed May 14, 1956 and now abandoned.

All of the foregoing processes provide a solid polymer product in the form of a slurry of precipitated polymer in a liquid solvent or diluent. In order that the polymer may be obtained in a useful state, it is necessary that the liquid and solid be separated. One method proposed for this purpose comprises introducing the slurry to a stripping zone wherein solvent removal is effected by heat and contact with steam. Although the desired separation can be effected in this manner, it has been found that considerable fouling of the interior of the stripping zone sometimes occurs during the process.

It is an object of this invention to provide improved method and means for separating solid polymers from a mixture of polymers and liquid solvent.

Another object of this invention is to provide improved process and means for minimizing equipment fouling and separating precipitated polymers from a solvent.

Still another object of the invention is to provide improved method and means for separating precipitated solid olefin polymers from a slurry of said polymers in a solvent material.

Yet another object of this invention is to provide an improved stripping method and apparatus for separating solid ethylene polymers from cyclohexane.

These and other objects of the invention will become more readily apparent from the following detailed description and discussion:

The aforementioned objects are achieved broadly by contacting a slurry of solid polymer and solvent with a surface wetted with heated water whereby the polymer is dispersed in the water and a sufficient portion of the solvent is vaporized to provide a mixture of reduced agglomerating tendency. The mixture is then subjected to contact with steam whereby the remainder of the solvent is removed by heat and stripping.

In a more specific aspect, a slurry of solid polymers in a solvent material is sprayed onto a surface wetted with heated flowing water, said surface being disposed within the vapor space of a steam stripping zone whereby steam contacts the sprayed slurry before and after said slurry reaches the wetted surface.

In another aspect of the invention, a slurry of solid polymer in a solvent material is sprayed onto a moving surface wetted with flowing water.

This invention is applicable in general to the treatment of solid polymers. It has particular utility when applied to the treatment of a slurry of olefin polymers such as, for example, polymers or copolymers of monoolefins like ethylene, propylene, butylene, etc., also copolymers of monoolefins and diolefins such as butadiene, isoprene, etc. Olefin polymers more usually treated are polymers of 1-olefins having a maximum of 8 carbon atoms per molecule and no branching nearer the double bond than the 4-position.

In a preferred embodiment the invention is directed to the treatment of polymer materials prepared from ethylene which have a density of at least 0.94 and preferably 0.96 or higher and a crystallinity of at least 70 percent and preferably at least 80 percent, at ambient temperatures. It has been found that the method and apparatus of this invention are particularly effective in the treatment of these polymers. While these polymers represent a preferred embodiment of the invention other polymers, as related above, are also treated and it is not intended that the scope of the invention be limited to the treatment of any particular polymer or polymers.

A number of methods are available for preparing polymers of olefins. One method is described in detail in a copending application of Hogan and Banks, Serial No. 573,877, filed March 26, 1956, now Patent No. 2,825,721. This particular method utilizes a chromium oxide catalyst, preferably containing hexavalent chromium, with silica, alumina, silica-alumina, zirconia, thoria, etc. In one embodiment of this application, olefins are polymerized in the presence of a hydrocarbon diluent, for example an acyclic, cycloalicyclic or aromatic compound which is inert and in which the formed polymer is soluble. The reaction is carried out at a temperature between about 150° F. and about 450° F. and usually under a pressure sufficient to maintain the reactant and diluent in the liquid state. The polymers produced by this method, particularly the polymers of ethylene, are characterized by having an unsaturation which is principally either trans-internal or terminal vinyl, depending on the particular process conditions employed. When low reaction temperatures, about 150° F. to about 320° F., and a mobile catalyst are used for polymerization, the product polymer is predominantly terminal vinyl in structure. When polymerization is carried out at higher temperatures and in a fixed catalyst bed, the polymer has predominantly trans-internal unsaturation. Polymers prepared by both methods are also characterized by their high densities and high percentage of crystallinity.

Other procedures which employ different catalysts are also used for preparing olefin polymers. For example, polymers are prepared in the presence of organometallic compounds such as triethylene aluminum plus titanium tetrachloride, mixtures of ethylaluminum halides with titanium tetrachloride, and the like. Another group of catalysts which is used comprises a halide of a group IV metal such as, for example, titanium tetrachloride, silicon tetrabromide, zirconium tetrachloride, tin tetrabromide, etc., with one or more free metals selected from the group consisting of sodium, potassium, lithium, rubidium, zinc, cadmium and aluminum.

The solvent or diluent employed in the polymerization reaction includes in general, paraffins which dissolve the polymers at the temperature employed in the reaction zone. Among the more useful solvents are paraffins having between about 3 and about 12 carbon atoms per molecule, such as, for example, propane, isobutane, n-pentane, isopentane, isooctane, etc., and preferably those paraffins having 5 to 12 carbon atoms per molecule. Also useful in the polymerization reaction are alicyclic hydrocarbons, such as cyclohexane, methylcyclohexane, etc. Aromatic diluents are also used, however, in some instances they (or impurities therein) tend to shorten the catalyst life, therefore their use will depend on the importance of catalyst life. All of the foregoing and in addition, other hydrocarbon diluents which are relatively inert and in the liquid state at the reaction conditions may also be employed in carrying out the reaction of olefins to form solid polymers.

As previously stated, one of the problems attendant with separation of solvent from precipitated polymer by stripping is the agglomerating tendency of the polymer which may cause extensive fouling of the stripping apparatus. It has been found that the concentration of polymer in the solvent has a substantial effect on the agglomerating properties of this material. For example, it appears that the adhesive tendencies of the polymer are greatest when this material is present in the solvent in an amount of between about 2 and about 6 percent by weight. When the concentration of polymer is above this range, there is much less tendency for this material to adhere to metal surfaces. In the method of this invention, a procedure is provided whereby the polymer-solvent mixture is passed through the range of maximum agglomeration without fouling of the stripping apparatus.

In carrying out the process of this invention in one of its embodiments, a slurry of solid olefin polymers in a hydrocarbon solvent is introduced to a preconcentrating zone which is disposed within the vapor space of a steam stripping zone. The preconcentrating zone contains a continuous concave surface, for example, the inner surface of an elongated cylinder, which is disposed vertically in said vapor space. The concave surface is continuously supplied with heated water to provide a moving film of liquid thereon. The slurry material is sprayed on the wetted surface from a central portion of the preconcentrating zone, passing through a vapor space before contacting said surface. During this operation, steam introduced to the stripping zone passes upwardly into the vapor space in contact with the sprayed solution and the wetted surface. Due to the partial pressure effect of the steam and the temperature of the heated water film, solvent is vaporized from the sprayed slurry. When the slurry contacts the wetted wall of the preconcentrating zone, the velocity of contact of the wetting liquid and slurry causes the polymer to be dispersed therein, thereby preventing agglomeration of polymer particles. The presence of the liquid film and the velocity thereof also prevents the polymer from sticking to the walls of the predrying zone. As the polymer-solvent-water mixture passes downwardly along the wetting surface, it is continuously exposed to steam, thus effecting a continuous evaporation of solvent.

Leaving the preconcentrating zone, the polymer-water-solvent mixture drops through the stripping zone vapor space into a liquid mixture of water, solvent and polymer. Steam is introduced below the level of the liquid mixture in sufficient quantities to provide a temperature and stripping effect which is adequate to remove the remaining solvent from the mixture. A product, comprising polymer and water, essentially free from solvent is withdrawn from the stripping zone, usually from the bottom portion thereof. This material is passed through additional processing operations, for example, skimming and drying, whereby a dried solvent-free polymer product is provided.

In view of the agglomerating tendencies of the polymer, it is desirable that the polymer-solvent slurry entering the preconcentrating zone be maintained below about 8 percent polymer by weight. More usually, the concentration of polymer in the entering slurry is between about 2 and about 6 percent. During passage of the polymer-solvent-water mixture through the preconcentrating zone, the combined effect of the steam and the extended water surface acts to reduce the amount of solvent in the mixture to provide a polymer concentration above about 6 percent by weight and, preferably, between about 8 percent and about 15 percent, relative to the solvent present.

An important feature in determining the agglomerating properties of the polymer relates to the physical characteristics of this material during the solvent removal process. For example, if the polymer during solvent removal is present as large particles or chunks, it may well contain occluded solvent which will not be easily removed by heat or stripping. Thus, even after treatment in the stripping zone, solvent may be present in a sufficient amount to provide a ratio of polymer-to-solvent in the agglomerating range. In the method of this invention, dispersion of the polymer in the water film prevents the formation of large particles of polymer and eliminates the problem of solvent occlusion.

Another factor in the operation of the preconcentrating zone is the time during which the polymer-solvent slurry is in contact with steam and the water film. More usually, in order to provide the desired solvent removal, the polymer is retained in the preconcentrating zone for a period of time between 0.1 and about 5 seconds and preferably between about 0.5 and about 2 seconds. To provide this residence time with a water film moving linearly in a vertical direction would require a preconcentrating zone of extended length. In the method of this invention, the preconcentrating zone of substantially reduced length is provided by introducing water thereto tangentially to the wetted surface whereby the water passes through a spirally descending path through said zone. In this way, it is possible to provide a wetted surface of greatly extended flow length and at the same time maintain a sufficient water velocity to provide effective dispersion of the polymer. The velocity of the water film is generally maintained between about 0.1 and about 20 feet per second and preferably between about 1 and about 5 feet per second. A suitable residence time within the preconcentrating zone is obtained by providing a polymer-solvent slurry feed rate of between about 200 and about 1500 pounds per hour per square foot of wetted surface. More usually, it is preferred to operate in the range of between about 600 and about 1200 pounds per hour per square foot. The depth of the water on the wetted surface must be sufficient to provide the desired polymer dispersion but not so great as to overcome the spiral flow of the wetting water. Usually, sufficient water is introduced to the preconcentrating zone to provide a wetted surface having a water depth of between about 0.05 and about 1 inch.

The temperature of the preconcentrating zone is ordinarily in the same range as the temperature in the stripping zone proper, that is between about 120 and about 300° F., depending on the particular polymer being treated and the solvent material to be removed therefrom. As previously stated vaporization of solvent in the preconcentrating zone is effected by a combination of the heat of the water on the wetted surface and the partial pressure effect of the steam in the stripper vapor space. The water which is supplied to the wetted surface is conveniently obtained by recycling water separated from the polymer-water mixture removed as product from the stripping zone. This provides a water film which initially has a temperature substantially equal to the temperature in the stripping zone. The polymer slurry entering the preconcentrating zone is at relatively low temperature, usually between about 100° F. and about 200° F. It is desirable to maintain a temperature differential of between about 25° F. and about 100° F. between the entering slurry and the wetted wall. The two streams of course stabilize at some intermediate temperature before the polymer-solvent-water mixture leaves the wetted surface.

The amount of steam which is introduced to the stripping zone will depend on the structure of the zone, the polymer being treated, and the particular solvent to be removed. More usually, the quantity of steam required is between about 0.01 and about 2 pounds per pound of polymer-solvent slurry feed. The stripping operation may be carried out over a range of pressures from below atmospheric to superatmospheric. It is preferred, however, to operate usually between about 14 and about 16 p.s.i.a.

Under the conditions of temperature and pressure existing in the stripping zone the steam leaving the liquid surface of this zone and entering the preconcentrating zone contains a substantial amount of solvent admixed with it. Inasmuch as considerations of equilibrium limit the amount of solvent which can be present in the steam-solvent mixture, the quantity of solvent which can be removed from the slurry in the preconcentrating zone is dependent on the concentration of solvent in the steam entering this zone. In order to provide a more effective removal of solvent during preconcentrating, it is sometimes dsirable to admit a quantity of steam directly to the preconcentrating zone in addition to the stripping steam. Since steam introduced to the stripping zone has a temperature of at least 212° F. before entering this zone, the temperature of the steam-solvent mixture entering the preconcentrating zone is increased by the introduction of fresh steam, thus providing a higher temperature in the latter zone than in the stripping zone proper. The two factors of higher temperature and higher steam to solvent ratio in the vapor act to provide a quicker and/or greater removal of solvent from the polymer slurry, thus providing a degree of flexibility in the process.

It is usually desirable to provide agitation in the liquid section of the stripping zone. This aids in the stripping operaton and also prevents settling of polymer from the water-polymer mixture.

In order to more clearly define the invention and provide a better understanding thereof, reference is had to the accompanying drawings of which:

Figure 1 is a diagramatic illustration of a preconcentrator and stripper suitable for carrying out the invention, and Figure 2 is a diagrammatic illustration of a preconcentrator apparatus containing a moving wetted surface.

Referring to Figure 1, a ploymer solution at a temperature of about 240° F. comprising about 4.5 percent by weight of dissolved ethylene polymer in cyclohexane is introduced to the stripping system through conduit 2 and mixed with water at a temperature of about 100° F. introduced through conduit 4. The amount of water admixed with the solution is controlled to provide a mixture having a temperature of about 125° F. In this particular example about 2.5 parts of water per part of solution by weight are required. Precipitation of polymer from solution takes place during the mixing step, thus providing a slurry of solid precipitated polymer in solvent. This material is passed through conduit 6 and introduced to a spray nozzle 10 disposed within preconcentrator 8. The pressure upstream of nozzle 10 is sufficient to prevent any vaporization in conduit 6. Preconcentrator 8 is a cylindrical member which is open at the bottom and is disposed vertically in a stripper 12. Within the stripper there is contained a liquid mixture 16 of water, solvent and polymer. The preconcentrator is disposed within the stripper vapor space above this liquid in such a manner that material leaving the preconcentrator passes through the vapor space and into the liquid mixture without contacting the walls or other structural members of the stripper. The inner surface of the preconcentrator is wetted with heated moving water which is supplied thereto through conduit 24. In order to provide an extended resdience time of the water in the preconcentrator it is introduced to the upper portion thereof and tangentially to the wetted surface.

The polymer slurry passing through spray nozzle 10 is finely subdivided and distributed on the inner wetted wall of the preconcentrator. The velocity and degree of subdivision of the sprayed slurry is such that polymer striking the wetted surface is dispersed in the moving water in the form of small particles thereby forming a mixture of polymer, water and solvent. During its passage from the spray nozzle to the wetted surface, the slurry is contacted with steam (introduced in a manner hereinafter described) present in the vapor space of the stripper. Due to the partial pressure of the steam a portion of the solvent is vaporized from the slurry, the heat required being supplied by the heated water on the wetted surface. The steam in the preconcentrator is also in contact with the wetted surface contained therein. As a result a continuous vaporization of solvent from the polymer-solvent-water mixture takes place as this material passes downwardly on the wetted surface and enters the liquid mixture 16.

As a result of the vaporization which takes place in the preconcentrator the material entering the liquid mixture 16 is increased in polymer content to about 7 percent, relative to the solvent present, which is above the range of concentration in which the polymer tends to agglomerate and adhere to metal surfaces.

In order that the remaining solvent may be removed from the material leaving the preconcentrator stripping steam is introduced beneath the level of liquid 16 through conduit 17. The heating and partial pressure effect of the steam is sufficient to vaporize solvent entering the liquid 16, which vapors pass into the vapor space 14 admixed with uncondensed steam. This mixture provides the source of the steam which passes into the predryer 8.

Provision is made to withdraw a mixture of polymer and water substantially free of solvent from stripper 12 through conduit 26. This material is introduced to a skim tank 28 from which wet polymer is removed through conduit 30 and the major portion of the water in the mixture is removed through conduit 32. If it is desired to obtain a dried polymer, the product from conduit 30 can be subjected to a further treatment for the removal of residual water. A vapor line 13 is provided for the removal of solvent and steam from the stripper. If desired an additional vent or vapor line 15 can be provided in the upper portion of preconcentrator 8 for the release of vapors therefrom.

It is desirable in the process to provide heated water to the preconcentrator wetted surface at a substantially higher temperature than the polymer slurry feed, preferably water of the same range of temperature that exists in the stripping zone. Accordingly, a quiescent zone below the level of liquid 16 is provided by a baffle 20 and heated water is withdrawn from this zone and passed through pump 22 and conduit 24 to the preconcentrator. As previously mentioned, the water is admitted tangentially to the wetted surface to provide an extended residence time of the water-polymer-solvent mixture in the preconcentrating zone.

The preceding embodiment of the invention has been directed to a system in which the wetted surface of the preconcentrator comprises the inner surface of a vertically disposed cylindrical member. It is, however, within the scope of the invention to utilize as a wetted surface other apparatus, the only limitation being that the surface be adaptable to provide a downwardly moving film of a liquid. Thus, for example, the wetted surface can comprise the inner surface of an inverted frustum of a cone, a continuous helical member such as for example, a hollow member of circular cross section in the shape of a spiral, etc. Although the stripper arrangement illustrated provides a preferred embodiment of the invention, it is within the scope of the invention to use other conventional types of stripping apparatus which provide a vapor space superposed above a liquid.

The following data illustrate a typical application of a preferred embodiment of the invention:

Example

Ethylene was polymerized in a continuous process in a 20 gallon reactor in the presence of a chromium oxide-silica-alumina catalyst containing 2.5 percent by weight of chromium. Prior to the reaction, the catalyst was activated in air by subjecting it to gradually increasing temperature up to 950° F. The operating conditions under which the polymer was formed were as follows:

Ethylene feed rate _____ 135 s.c.f.h.
Cyclohexane feed rate _____ 61 lb./hr.
Polymer concentration in reactor ___ 7.9 wt. percent.
Catalyst concentration in reactor ___ 5.6 wt. percent.
Pressure _____ 420 p.s.i.g.
Temperature _____ 283 ° F.

Following removal of catalyst and unreacted ethylene a 3 percent solution of polymer in cyclohexane was precipitated and separated from the solvent in a system similar to that of Figure 1. The results are given below:

| Run No. | Polymer Solution to Predrier, g.p.m. | Water to Precipitate Polymer, g.p.m. | Temperature of Slurry, ° F. | Stripper Temperature, ° F. | Water to Wetted Surface, g.p.m. | Type of Final Polymer Product |
| --- | --- | --- | --- | --- | --- | --- |
| 66 | 0.14 | 0.37 | 112 | 170 | 21 | Uniform, fine. |
| 67 | 0.35 | 0.52 | 112 | 169 | 21 | Do. |
| 68 | 0.34 | 0.42 | 122 | 170 | 21 | Do. |
| 69 | 0.50 | 0.58 | 126 | 170 | 15-21 | Do. |
| 70 | 0.58 | 0.60 | 126 | 168 | 10-21 | Slightly coarser. |

The stripper used in the above test had a volume of 50 gallons and the predrier was a vertical cylinder with a diameter of 11 inches and a wetted surface area of 346 square inches.

The previous discussion has been directed to the method and apparatus for preconcentrating in which the wetted surface is stationary and movement of water across said surface is provided by gravity and/or by the velocity of the water entering the surface. It is also within the scope of the invention to provide a moving wetted surface whereby movement of water thereupon is provided by the motion of the surface. A type of apparatus suitable for this purpose is shown in Figure 2. Referring to Figure 2 a polymer slurry produced by controlled cooling of a polymer solution is introduced to a preconcentrator through conduit 6. The preconcentrator comprises a flat circular metal plate 42 supported and rotated about its perpendicular axis by a driver 46. Surrounding the outer periphery of the plate is a shielding member 44, open at the top, which is disposed in such a manner as to deflect downwardly material leaving the horizontal plate. The entire structure is disposed within the vapor space 14 of stripper 12 in such a manner that the plate 42 is horizontal, and such that material leaving the plate enters a liquid mixture 16 of water, solvent and polymer without touching the walls of the stripper.

The slurry entering through conduit 6 passes through spray nozzles 40 arranged around the perpendicular axis of plate 42. The wetted surface is provided by introducing water to plate 42, also in the vicinity of said axis, through conduit 24. The centrifugal force created by rotation of the plate causes the water and slurry to flow to its outer periphery. Because of the motion of plate 42, it is not necessary that water be introduced thereto tangentially; however, if a greater water velocity is desired than can be provided by centrifugal force a tangential stream of water may be provided. The preconcentrating apparatus of this embodiment performs the same functions as the preconcentrator described in conjunction with Figure 1. In this particular embodiment the steam atmosphere in the preconcentrator is provided by steam entering through the open top of the shielding member 44. The mixture of slurry and water leaving the preconcentrator apparatus passes through the vapor space 14 into the liquid mixture 16 wherein the remaining solvent is removed by steam introduced through conduit 17. The rest of the operation is then carried out in a similar manner to that described and illustrated in Figure 1. Although not shown in the drawing it may be desirable to introduce water to the inner surface of guard 44 to supply a wetted surface at the point of deflection of material leaving plate 42.

The preceding embodiments have been directed to a process in which stripping steam is introduced to the stripping zone; however the same effect can be provided by supplying heat to the liquid in this zone in sufficient quantity to boil the water contained therein. Although steam stripping is preferred, for obvious reasons, it is within the scope of the invention to obtain the desired partial pressure effect by the use of any suitable inert gasiform material, such as for example, nitrogen, flue gas, etc. To aid in the effectiveness of the wetted wall it may be desirable to add a surface active or wetting agent to the water introduced to the preconcentrating zone.

Having thus described the invention by providing specific examples thereof it is to be understood that no undue restrictions or limitations are to be drawn by reason thereof.

We claim:

1. In the treatment of solid olefin polymer which is a polymer of 1-olefin having a mixmum of 8 carbon atoms per molecule and no branching nearer the double bond than the 4-position precipitated from solution in which the solvent is separated from the polymer by heat and stripping, said solvent being selected from the group consisting of paraffins and alicyclic hydrocarbons having 5 to 12 carbon atoms per molecule, during which treatment the polymer passes through a range of polymer-to-solvent concentration wherein it tends to agglomerate and adhere to metal surfaces, the improvement which comprises introducing a slurry of said polymer in solvent in a concentration of between about 2 and about 6 percent to a preconcentrating zone containing steam and having a surface wetted with heated moving water and spraying the slurry onto said wetted surface whereby the polymer is dispersed in the water, solvent is vaporized from the slurry to increase the polymer concentration thereof to above about 6 percent, thereby passing the slurry without agglomeration through the agglomerating range of polymer concentration.

2. The process of claim 1 in which the wetter surface of the preconcentrating zone comprises a vertically disposed continuous concave surface to which water is introduced tangentially.

3. In the treatment of solid olefin polymer which is a polymer of 1-olefin having a mixmum of 8 carbon atoms per molecule and no branching nearer the double bond than the 4-position precipitated from solution in which the solvent is separated from the polymer by heat and stripping, said solvent being selected from the group consisting of paraffins an alicyclic hydrocarbons having 5 to 12 carbon atoms per molecule, during which treatment the polymer passes through a range of polymer-to-solvent concentration wherein it tends to agglomerate and adhere to metal surfaces, the improvement which comprises introducing a slurry of said polymer in solvent in a concentration of between about 2 and about 6 percent to a preconcentrating zone having a surface wetted with heated moving water, spraying the slurry onto said wetted surface whereby polymer is dispersed in the water and solvent is vaporized from the slurry, contacting the sprayed slurry with steam before it reaches the wetted surface, continuing contact of the steam with the slurry while the slurry is on the wetted surface, retaining the slurry on the wetted surface for a sufficient period of time to increase the polymer concentration thereof to above about 6 percent, thereby passing the slurry without agglomeration through the agglomerating range of polymer concentration and introducing the slurry and water to a steam stripping zone wherein the remaining solvent is removed by heat and stripping.

4. In the treatment of solid polyethylene precipitated from solution in cyclohexane in which the solvent is separated from the polymer by heat and stripping, during which treatment the polymer passes through a range of polymer-to-solvent concentration wherein it tends to agglomerate and adhere to metal surfaces, the improvement which comprises introducing a slurry of said polymer in solvent in a concentration of between about 2 and about 6 percent to a vertically disposed elongated cylindrical preconcentrating zone having its inner surface wetted with heated moving water, said zone being disposed within and in open communication with the vapor space of a steam stripping zone, spraying the slurry onto said wetter surface whereby solvent is vaporized from the slurry, contacting the sprayed slurry with steam before the slurry reaches the wetted surface, continuing contact of the steam with the slurry while the slurry is on the wetted surface, retaining the slurry on the wetted surface for a sufficient period of time to increase the polymer concentration thereof to above about 6 percent, thereby passing the slurry without agglomeration through the agglomerating range of polymer concentration, maintaining below the preconcentrating zone a liquid mixture of water, solvent and polymer into which the slurry and water leaving the preconcentrating zone passes and introducing steam below the liquid level of said mixture whereby the solvent is vaporized therefrom.

5. The process of claim 4 in which the wetted surface is provided by introducing water tangentially to the upper portion of the preconcentrating zone.

6. The process of claim 4 in which steam is introduced directly to the preconcentrating zone.

7. A process for the treatment of solid polyethylene precipitated from a solution of cyclohexane which comprises introducing a slurry of said polymer in solvent in a concentration of between about 2 and about 6 percent to a preconcentrating zone having a surface wetted with heated moving water, spraying the slurry onto said wetted surface whereby polymer is dispersed in the water and solvent is vaporized from the slurry, contacting the wetted surface with steam, retaining the slurry on the wetted surface for a sufficient period of time to increase the polymer concentration thereof to above about 6 percent and introducing the slurry and water to a steam stripping zone wherein the remaining solvent is removed by heat and stripping.

8. The process of claim 7 in which the polymer is a polymer of ethylene having a density above 0.94 and a crystallinity of at least 70 percent.

9. A process for the treatment of solid polythylene precipitated from a solution of cyclohexane which comprises introducing a slurry of said polymer in solvent at a temperature between about 100° F. and about 200° F. in a concentration of between about 2 and about 6 percent to a preconcentrating zone having a moving surface wetted with water heated to a temperature between about 25° F. and about 100° F. above said slurry temperature, spraying the slurry onto said wetted surface whereby solvent is vaporized from the slurry, contacting the sprayed slurry with steam before the slurry reaches the moving wetted surface, continuing contact of the steam with the slurry while the slurry is on the wetted surface, retaining the slurry on the wetted surface for a sufficient period of time to increase the polymer concentration to above about 6 percent and introducing the slurry and water to a steam stripping zone wherein the remaining solvent is removed by heat and stripping.

10. The process of claim 9 in which water is introduced to the moving surface in such a manner that centrifugal force provides movement of the water relative to the moving surface, said water moving at a relative velocity of between about 0.1 and about 20 feet per second.

11. A process for the treatment of solid polyethylene precipitated from a solution of cyclohexane which comprises introducing a slurry of said polymer in solvent at a temperature of between about 100° F. and 200° F. in a concentration of between about 2 and about 6 percent to a preconcentrating zone having a surface wetted with water heated to between about 25 and about 100° F. above the temperature of said slurry, said water having a velocity between about 0.1 and about 20 feet per second, spraying the slurry onto said wetted surface whereby solvent is vaporized from the slurry, contacting the sprayed slurry with steam before the slurry reaches the wetted surface, continuing contact of the steam with the slurry while the slurry is on the wetted surface, retaining the slurry on the wetted surface for a sufficient period of time to increase the polymer concentration to above about 6 percent and introducing the slurry and water to a steam stripping zone wherein the remaining solvent is removed by heat and stripping.

12. Apparatus for separating a liquid solvent from a slurry of solid polymer and solvent which comprises in combination a stripping means adapted to contain a liquid mixture of water, solvent and polymer superposed by a vapor phase, means for introducing steam to said stripping means below said liquid level whereby solvent is removed from the mixture by heat and stripping conduit means for removing a mixture of water and polymer from the stripping means, a flat circular preconcentrating member adapted to be rotated in a horizontal plane about its perpendicular axis, said preconcentrating member being disposed within said vapor phase, means for introducing heated water in the central portion of said member, means for rotating said member whereby a movement of water across said member is provided, shielding means about the periphery of said member whereby water discharged therefrom is deflected downwardly, means for spraying a slurry of solid polymer and solvent onto said wetted surface and conduit means for withdrawing vapors from said vapor space.

References Cited in the file of this patent

UNITED STATES PATENTS

| | | |
|---|---|---|
| Re. 22,210 | De Simo et al. | Oct. 27, 1942 |
| 2,472,037 | Wurth et al. | May 21, 1949 |
| 2,599,067 | Otto | June 3, 1952 |
| 2,766,224 | Bannon | Oct. 9, 1956 |